United States Patent
Rajbhoj et al.

(10) Patent No.: US 12,462,111 B2
(45) Date of Patent: Nov. 4, 2025

(54) METHOD AND SYSTEM FOR AUTOMATED AUTHORING OF PURPOSIVE MODELS FROM NATURAL LANGUAGE DOCUMENTS

(71) Applicant: Tata Consultancy Services Limited, Mumbai (IN)

(72) Inventors: Asha Sushilkumar Rajbhoj, Pune (IN); Padmalata Venkata Nistala, Hyderabad (IN); Vinay Kulkarni, Pune (IN); Shivani Soni, Pune (IN); Ajim Innus Pathan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 272 days.

(21) Appl. No.: 18/218,647

(22) Filed: Jul. 6, 2023

(65) Prior Publication Data
US 2024/0046047 A1 Feb. 8, 2024

(30) Foreign Application Priority Data
Aug. 5, 2022 (IN) .............................. 202221044944

(51) Int. Cl.
*G06F 40/40* (2020.01)
*G06F 40/211* (2020.01)
(Continued)

(52) U.S. Cl.
CPC ............ *G06F 40/40* (2020.01); *G06F 40/211* (2020.01); *G06F 40/242* (2020.01); *G06F 40/295* (2020.01)

(58) Field of Classification Search
None
See application file for complete search history.

(56) References Cited

U.S. PATENT DOCUMENTS 7,613,602 B2  11/2009  Kanawa
9,171,060 B2 * 10/2015  Oberle ...................... G06F 8/51
(Continued)

FOREIGN PATENT DOCUMENTS

EP        0 280 866 A2     9/1988

OTHER PUBLICATIONS

Rajbhoj, Asha, et al. "Doctomodel: Automated authoring of models from diverse requirements specification documents." 2023 IEEE/ACM 45th International Conference on Software Engineering: Software Engineering in Practice (ICSE-SEIP). IEEE, 2023. (Year: 2023).*

*Primary Examiner* — Douglas Godbold
(74) *Attorney, Agent, or Firm* — Finnegan, Henderson, Farabow, Garrett & Dunner, LLP

(57) ABSTRACT

The present disclosure is of a method for automated authoring of purposive models from Natural Language (NL) documents. Conventional model extractors to automatically extract models from NL documents are specific to a metamodel, do not consider document structure and are not configurable. Initially, the system receives a plurality of Natural Language (NL) documents, a metamodel, a plurality of pattern trees corresponding to the metamodel, and a configurable domain dictionary. Each of the plurality of pattern trees includes a plurality of pattern elements. Further, a document information is generated from each of the plurality of NL documents using a document information reading technique. Finally, a plurality of purposive models are generated for each of the plurality of NL documents by interpreting a corresponding document information based on the plurality of pattern trees and the metamodel using a pattern interpretation technique.

12 Claims, 8 Drawing Sheets

(51) Int. Cl.
    *G06F 40/242*    (2020.01)
    *G06F 40/295*    (2020.01)

(56) References Cited

U.S. PATENT DOCUMENTS

| | | | | |
|---|---|---|---|---|
| 9,904,677 | B2* | 2/2018 | Hamada | G06F 40/237 |
| 10,885,282 | B2* | 1/2021 | Ilić | G06F 40/211 |
| 12,242,845 | B2* | 3/2025 | Nasu | G06F 8/20 |
| 2004/0172237 | A1* | 9/2004 | Saldanha | G06F 40/211 |
| | | | | 704/4 |
| 2006/0265415 | A1* | 11/2006 | Abrams | G06F 40/30 |
| | | | | 707/999.102 |
| 2010/0275179 | A1* | 10/2010 | Mengusoglu | G06F 40/205 |
| | | | | 717/104 |
| 2015/0100942 | A1* | 4/2015 | Misbhauddin | G06F 8/20 |
| | | | | 717/104 |
| 2017/0068519 | A1* | 3/2017 | Huebra | G06F 8/35 |
| 2022/0012426 | A1* | 1/2022 | Ziemer | G06F 16/245 |
| 2023/0251857 | A1* | 8/2023 | Nasu | G06F 8/10 |
| | | | | 717/102 |
| 2023/0376609 | A1* | 11/2023 | Atighetchi | G06F 21/577 |

* cited by examiner

METHOD AND SYSTEM FOR AUTOMATED AUTHORING OF PURPOSIVE MODELS FROM NATURAL LANGUAGE DOCUMENTS

PRIORITY CLAIM

This U.S. patent application claims priority under 35 U.S.C. § 119 to: India Application No. 202221044944, filed on Aug. 5, 2022. The entire contents of the aforementioned application are incorporated herein by reference.

TECHNICAL FIELD

The disclosure herein generally relates to the field of Natural Language Processing (NLP) and, more particularly, to a method and system for automated authoring of purposive models from Natural Language (NL) documents.

BACKGROUND

Models in Model driven engineering (MDE), can be used for variety of purposes such as generating code from model, analysis using model, modeling processes, automating processes etc. However, many software processes in industry are still not automated and follows document centric approach instead of model based approach. Typically, multiple formatted Natural Language (NL) text or documents are prepared and maintained. For example, NL documents include requirements documents, design documents, proposal documents, solution knowledge documents, domain documents such as policy documents, medical writing documents etc. Document-centric approaches provide limited search capability and do not help in analysis. To transform manual document centric processes to automated model-based processes first step is to create models from documents. Manual creation of models from documents is a challenging task.

Conventional model extractors to automatically extract models from NL documents are specific to a purpose. For example, some existing Natural Language Processing (NLP) based tools support automated model extraction of a specific metamodels such as UML models, BPMN model, UseCase models, Insurance domain model, and the like. Here, different model extractors are created for extraction of different purposive models. Also, existing NLP based model extraction approaches do not take into cognizance the document structure, style & sub-section headings as well as figures, tables, and other semi-structured forms in which the information is captured. Given the variety of purposes and information existing in NL documents, creation of multiple model extractors is a challenging task. Hence, it is desirable to have a generic model extractor that can be configured for automated extraction of purposive models from any type of NL document.

SUMMARY

Embodiments of the present disclosure present technological improvements as solutions to one or more of the above-mentioned technical problems recognized by the inventors in conventional systems. For example, in one embodiment, a method for Automated authoring of purposive models from Natural Language (NL) documents is provided. The method includes receiving, by one or more hardware processors, a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax. Further, the method includes generating, by the one or more hardware processors, a document information from each of the plurality of NL documents, using a document information reading technique, wherein the document information comprises a plurality of document styles and a text information corresponding to each of the plurality of document styles. Finally, the method includes generating, by the one or more hardware processors, a plurality of purposive models for each of the plurality of NL documents by interpreting the document information corresponding to each of the plurality of NL documents, based on the plurality of pattern trees and the metamodel using a pattern interpretation technique.

In another aspect, a system for Automated authoring of purposive models from Natural Language (NL) documents is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax. Further, the one or more hardware processors are configured by the programmed instructions to generate a document information from each of the plurality of NL documents, using a document information reading technique, wherein the document information comprises a plurality of document styles and a text information corresponding to each of the plurality of document styles. Finally, the one or more hardware processors are configured by the programmed instructions to generate a plurality of purposive models for each of the plurality of NL documents by interpreting the document information corresponding to each of the plurality of NL documents, based on the plurality of pattern trees and the metamodel using a pattern interpretation technique.

In yet another aspect, a computer program product including a non-transitory computer-readable medium having embodied therein a computer program for Automated authoring of purposive models from Natural Language (NL) documents is provided. The computer readable program, when executed on a computing device, causes the computing device to receive a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax. Further, the computer readable program, when executed on a computing device, causes the computing device to generate a document information from each of the plurality of NL documents, using a document information reading technique, wherein the document information comprises a plurality of document styles and a text information corresponding to each of the plurality of document styles. Finally, the computer readable program, when executed on a computing device, causes the computing device to generate a plurality of purposive models for each of the plurality of NL documents by interpreting the document information corresponding to each of the plurality of NL documents, based on the plurality of pattern trees and the metamodel using a pattern interpretation technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
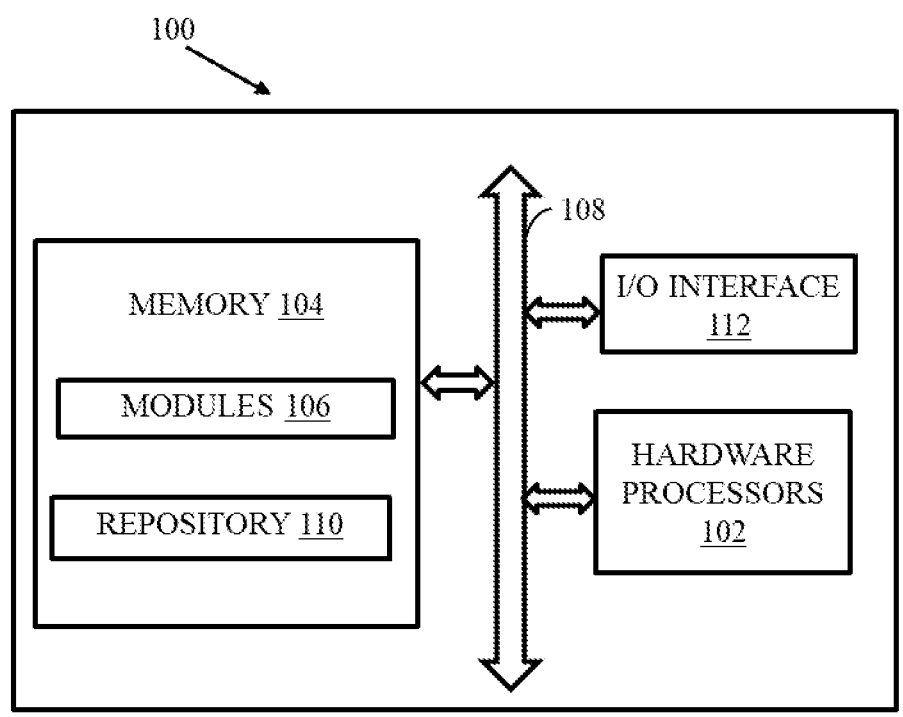
FIG. 1 is a functional block diagram of a system for automated authoring of purposive models from Natural Language (NL) documents, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Document-centric approaches provide limited search capability and do not help in analysis. These processes are time-consuming and error prone as manual and SME dependent. Much of this difficulty can be overcome if the information is available in a structured model form that is amenable to automated processing.

Embodiments herein provide a method and system for automated authoring of purposive models from NL documents. Given the uniqueness of a solution development endeavor in terms of the metamodel and structure of the document, the present disclosure generates purposive models. For generating these models from NL text documents, purpose-specific model extractors need to be developed. The structure and organization of the information in document influence the information extraction thus necessitating development of purpose-specific model extractor for each type of document. To overcome this lacuna, the present disclosure provides a generic approach for automated authoring of purpose-specific models from NL text documents. Being parameterized on metamodel and document structure-based patterns, the approach is generic and amenable to easy repurposing. The approach has been validated on multiple use cases covering diverse document formats as well as on multiple metamodels.

Initially, the system receives a plurality of Natural Language (NL) documents, a metamodel, a plurality of pattern trees corresponding to the metamodel, and a configurable domain dictionary. The metamodel includes a plurality of metamodel elements like class, property corresponding to each class and associations. Each of the plurality of pattern trees includes a plurality of pattern elements and each of the plurality of pattern elements includes a corresponding pattern statement defined using a pattern language syntax. Further, a document information is generated from each of the plurality of NL documents using a document information reading technique. The document information includes a plurality of document styles and a text information corresponding to each of the plurality of styles. Finally, a plurality of purposive models are generated for each of the plurality of NL documents by interpreting a corresponding document information based on the plurality of pattern trees and the metamodel using a pattern interpretation technique.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 is a functional block diagram of an automated authoring of purposive models from NL documents, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
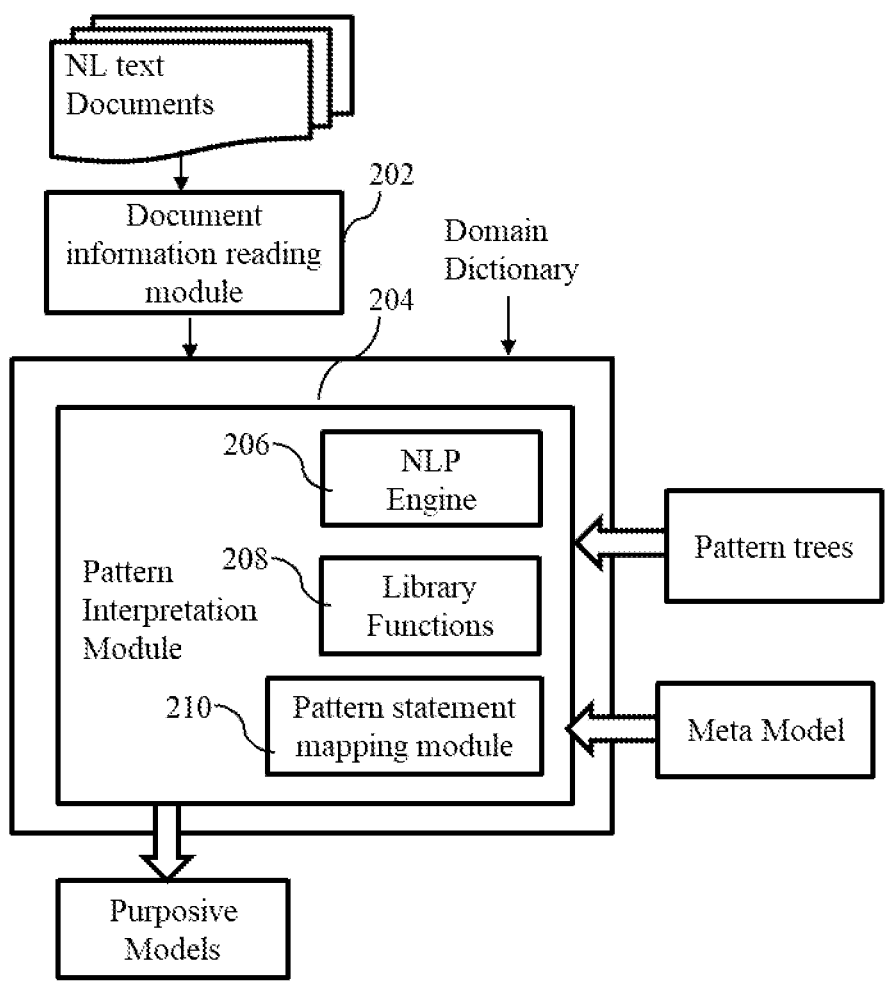
FIG. 2 illustrates a functional architecture of the system of FIG. 1, for automated authoring of purposive models from NL documents, in accordance with some embodiments of the present disclosure.

The plurality of modules 106 include programs or coded instructions that supplement applications or functions performed by the system 100 for automated authoring of purposive models from NL documents. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes a document information reading module (shown in FIG. 2) and a pattern interpreter module (shown in FIG. 2). The pattern interpretation module includes an NLP engine, library functions and a pattern statement mapping module (shown in FIG. 2). In an embodiment, FIG. 2 illustrates a functional architecture of the system of FIG. 1, for automated authoring of purposive models from NL documents, in accordance with some embodiments of the present disclosure. Now referring to FIG. 2, the NL documents are received by the document information reading module 202 and a document information corresponding to each NL document is generated. The document information includes a plurality of document styles and the corresponding text information. For example, the document style includes "Heading1" and the text content associated with the "Heading1" is the corresponding text information. Further, based on the corresponding document information, a plurality of pattern trees, the metamodel and domain dictionary, the purposive models are generated by the pattern interpretation module 204. The pattern statement mapping module 210 identifies object names, the corresponding property values and the corresponding associations, for generating the purposive model based on the NLP library functions, the metamodel and the pattern trees.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3, FIG. 6A and FIG. 6B.

Figure 3:
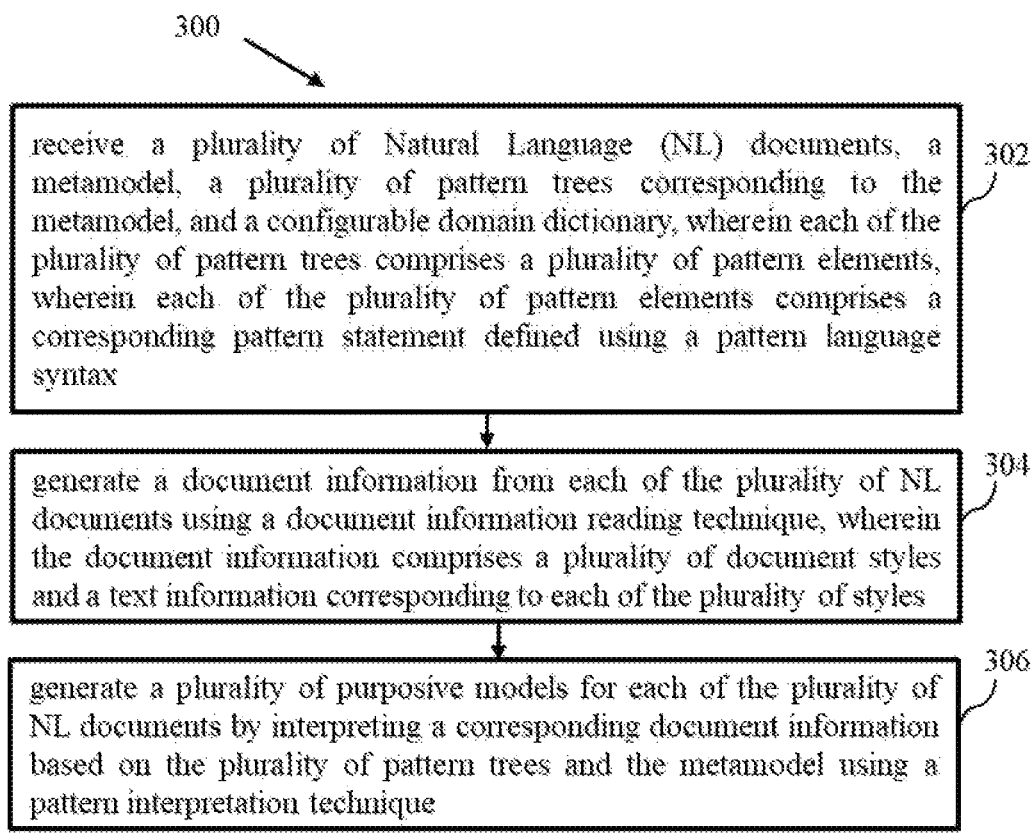
FIG. 3 is an exemplary flow diagram illustrating a processor implemented method 300 for automated authoring of purposive models from NL documents implemented by the system of FIG. 1 according to some embodiments of the present disclosure.

FIG. 3 is an exemplary flow diagram illustrating a method 300 for automated authoring of purposive models from NL documents implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive the plurality of Natural Language (NL) documents, the metamodel, the plurality of pattern trees corresponding to the metamodel, and the configurable domain dictionary. An example NL document is shown in Table I.

TABLE I

Figure 4:
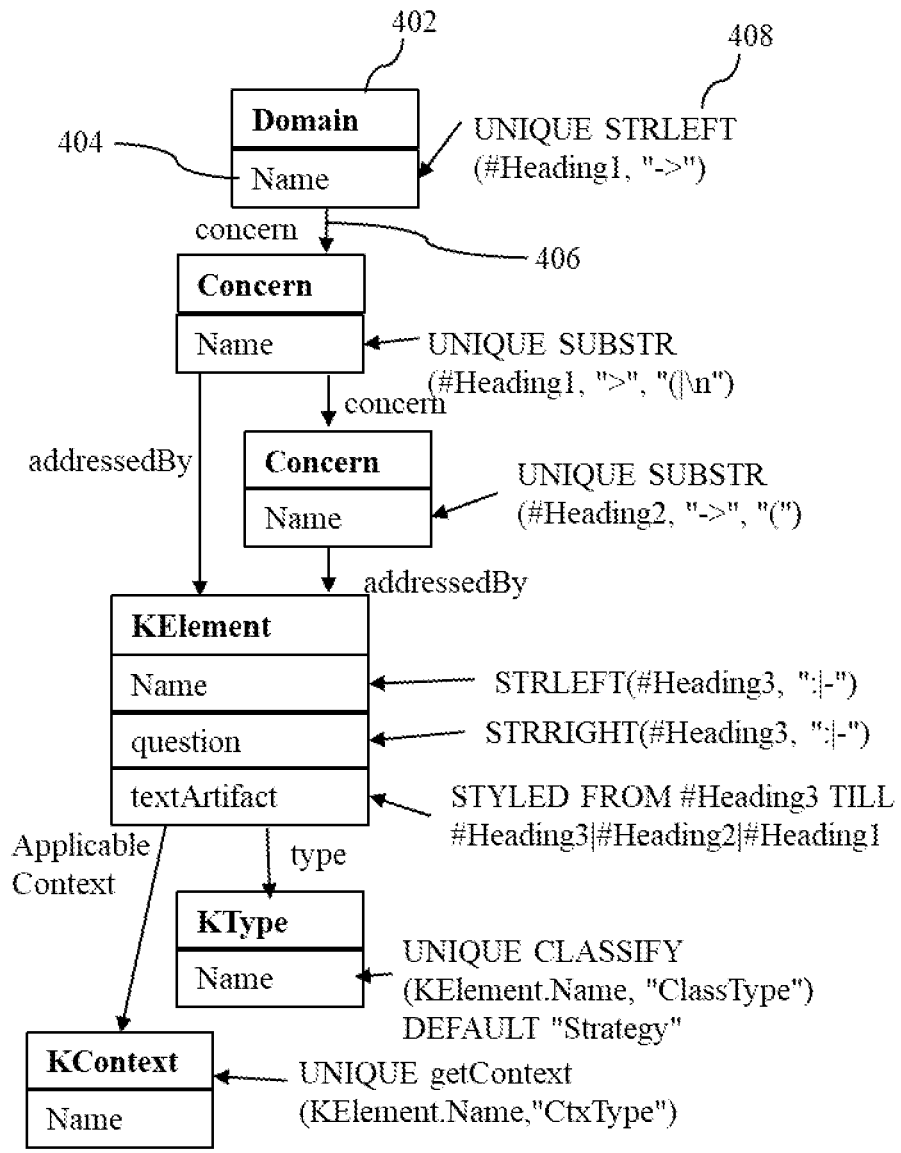
FIG. 4 is an exemplary pattern tree for the processor implemented method for automated authoring of purposive models from NL documents implemented by the system of FIG. 1 according to some embodiments of the present disclosure.

1. BCPDR –> BCP
1.1. BCP –> BCPPlan
  1. BCP Certification
Organization is enterprise-wide certified for ISO 22301:2012 (Business Continuity Management).
  2. BCP-DRP Approach Overview: Provide your understanding of a
    BCP situation. Provide solution to handle any such crisis.
Unforeseen business interruptions ranging from catastrophic natural disasters to acts of terrorism to technical glitches, organizations need business continuity and recovery resources, plans and management TABLE I-continued for these situations. Business Continuity Plan (BCP) and Disaster Recovery Plan (DRP) are processes that help organizations prepare for disruptive events, ranging from a disastrous hurricane to a simple power outage.
1.2. BCP -> BCPAudit
    1. BCP-DRP Audit Approach: Provide brief on the Audit approach undertaken to assess your BCP - DR Planning
All the Business Continuity Plans at Organization are reviewed, updated and signed off at least once in six months or within 30 days of any significant business change to ensure that it is current and pertinent.
    2. BCP Audit - Types of Tests:
BCPs and DRPs are reviewed and tested at periodic intervals to meet the following objectives:
• To ensure that plans are robust enough to ensure continuity of critical applications at the time of disaster In an embodiment, each of the plurality of pattern trees includes a plurality of pattern elements as shown in FIG. 4. The plurality of pattern elements includes a plurality of pattern nodes (for example, the node 402 of FIG. 4) in a plurality of levels, a plurality of pattern properties corresponding to each of the plurality of pattern nodes (for example, "name" 404 of the node 402), and a plurality of pattern edges (for example, edge 406 of FIG. 4).

Now referring to FIG. 4, each of the plurality of pattern elements includes a corresponding pattern statement defined using a pattern language syntax, (for example, the pattern statement 408 shown in FIG. 4).

In an embodiment, each of the corresponding plurality of pattern language syntax includes a plurality of heading structures, a plurality of table value structures, a default value structure, a metamodel reference structure, a block structure, a condition checking structure, function invocation structures, a control flow structure, a plurality of looping structures and the like.

TABLE II

| Pattern language syntax structures | Pattern Language Grammar Rules |
|---|---|
| Heading structure | HeadingExpr: HeadExpr (Operator HeadExpr)*; StyleExpr: StyleValue(Operator StyleValue)*; Style Value: (BOLD \| UNDERLINED \| BULLET \| NUMSTRING); HeadExpr: '#' HEADING Level |
| Table structure specifies how to extract values from tables in documents using column, row headings or directly using table cell column and row number. | table_row_stmt: TABLE_ROW QSTRING; table_nextrow_stmt: TABLE_NEXTROW QSTRING; table_column_stmt: TABLE_COLUMN QSTRING ; table_cell_stmt: TABLE_CELL CellExpr; CellExpr: NUMBER COMMA NUMBER; |
| Default Value structure specifies assignment of default values. | default_value_assign_stmt: DEFAULT (QSTRING \| functionExpr); |
| Metamodel Reference structure | mMExpr: NameExpr DOT NameExpr; |
| Block structure specifies boundaries to extract the block of lines. | block_stmt: FROM (HeadingExpr) TILL (HeadingExpr \| TABLE) |
| Condition structure checks condition using extracted metamodel properties or function return values. | if_stmt: IF mMexpr \| functionExpr (EQUALS QSTRING)?; |
| Function Invocation structures invokes library functions or | functionExpr: NameExpr LEFTPAREN ParamExpr (',' ParamExpr )* RIGHTPAREN; |
| external library functions with parameter values. | ParamExpr: table_stmt \| HeadingExpr \| StyleExpr \| table_stmt \| mMExpr \| QSTRING |
| Control Flow structure specifies the document content navigation. | goto_stmt: GOTO (QSTRING \| HeadingExpr); |

Now referring to Table II, grammar tokens are specified in capital letters. "?" represents the optional occurrence of expression, and "*" represents zero or more occurrences of expression. QSRING is a constant string. Operators can be "&" (AND), "|" (OR). Table II illustrates some of the grammar rules for extracting text from various headings, the plurality of styles in documents, process the text, and what structure can be nested with other structures and the like. For example, the heading structure syntax specifies that there may be one or more heading levels combined with "|" and it can have one or more styles like BOLD, UNDERLINED etc. Various pattern syntax structures can be part of other pattern syntax structures. For example, heading structure, table structure, metamodel structures can be specified in the block structure, condition structure and function invocation structure. Heading structure can also be specified inside control flow structure.

In an embodiment, Table III illustrates some examples of pattern language syntax. For example, using the table value structure syntax, TABLE_COLUMN "Attribute|Field Name" text value can be extracted from column of table with name "Attribute" OR "Field Name". Another example of heading structure syntax, "BULLET|NUMSTRING" indicates text value can be extracted from text specified with style BULLET OR NUMBERED style.

TABLE III

| Pattern language syntax structures | Pattern language syntax examples |
|---|---|
| Heading structures | • "#Heading1"<br>• "#Heading2"<br>• "#Heading3"<br>• "BULLET"<br>• "BULLET \| NUMSTRING"<br>• "NUMSTYLE" |
| Table value structures | • TABLE_COLUMN "Attribute \| Field Name"<br>• TABLE_CELL 7,2 // row number 7 , column number 2<br>• TABLE_NEXTROW "Description" // next row of "Description" row in table |
| Default value structure | • GUNIQUE CLASSIFY(KElement.Name, "ClassType") DEFAULT "Other" //Classify Name of KElement into predefined ClassType. if not classified, default class is "Other" |
| Metamodel reference structure | • Concern.Name //name reference of Concern<br>• KElement.textArtifact // textArtifact property reference of KElement |
| Block structure | • STYLED FROM CURRENT_SECTION_NAME TILL #Heading3\|#Heading2\|#Heading1 //extracts complete text from current section till next heading3 or heading2 or heading1 along with styles<br>• FROM NEXTOF #Heading1 TILL #Heading2 //extracts complete text between styles heading1 and heading2 |

TABLE III-continued

| Pattern language syntax structures | Pattern language syntax examples |
|---|---|
| Condition checking structure | • IF CLASSIFY(#Heading2,"FType")=="PFunction" //Checking whether heading2 text is classified as "PFunction" one of the predefined FType |
| Looping structure | • TABLE_ITER // iterates through all rows in extracted table, this is specified only for PatternNode, Interpreter creates Objectnode corresponding to each row text information |
| Function invocation structure | • STRCAT (Feature.Name, "Process") // In this STRCAT library function is invoked with Name of Feature and constant string "Process"<br>• getPSetName (TABLE_COLUMN ("*Attribute*\|*Field*")) // In this external library function getPSetName is called by passing each column values of table having either "Attribute" or "Field" string in column caption<br>• SPLITSTRING(TABLE_CELL 7,1,"\n")<br>• STRCAT(Query.Name, "Output ParamSet")<br>• CLASSIFY (FILENAME, FHierarchy) |
| Control flow structure | • GOTO "Normal Flow\|Process Flow" //This moves to the section either "Normal Flow" or "Process Flow" in document<br>• GOTO #Heading2 |

Figure 5:
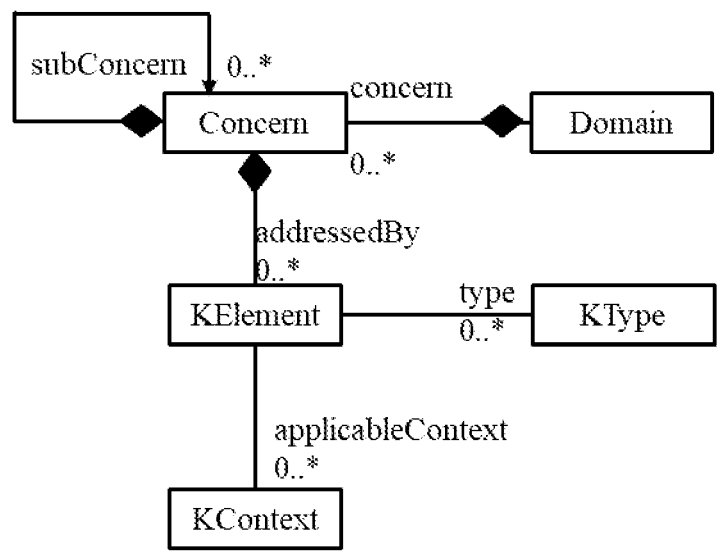
FIG. 5 is an exemplary metamodel for the processor implemented method for automated authoring of purposive models from NL documents implemented by the system of FIG. 1 according to some embodiments of the present disclosure.

FIG. 5 is an exemplary metamodel for the processor implemented method for automated authoring of purposive models from NL documents implemented by the system of FIG. 1 according to some embodiments of the present disclosure. Now referring to FIG. 5, the metamodel includes a plurality of metamodel classes and a corresponding plurality of associations. For example, considering the example shown in FIG. 5, the plurality of metamodel classes are "Domain", "Concern", "KElement", "KType" and "KContext". Here the class "Domain" can hold any object name and the class "Concern" holds a plurality of concerns associated with the "Domain". The "KElement" indicates the knowledge element, the "KType" indicates the knowledge type and the "KContext" indicates the knowledge context. Each class of the metamodel is associated with a corresponding "zero to many" associations.

Now referring to FIG. 3, at step 304 of the method 300, the document information reading module 202 executed by one or more hardware processors 102 is configured by the programmed instructions to generate a document information from each of the plurality of NL documents using a document information reading technique. For example, the document information reading techniques includes "Docx4J" and the like. The document information includes a plurality of document styles and a text information corresponding to each of the plurality of styles.

Figure 6A:
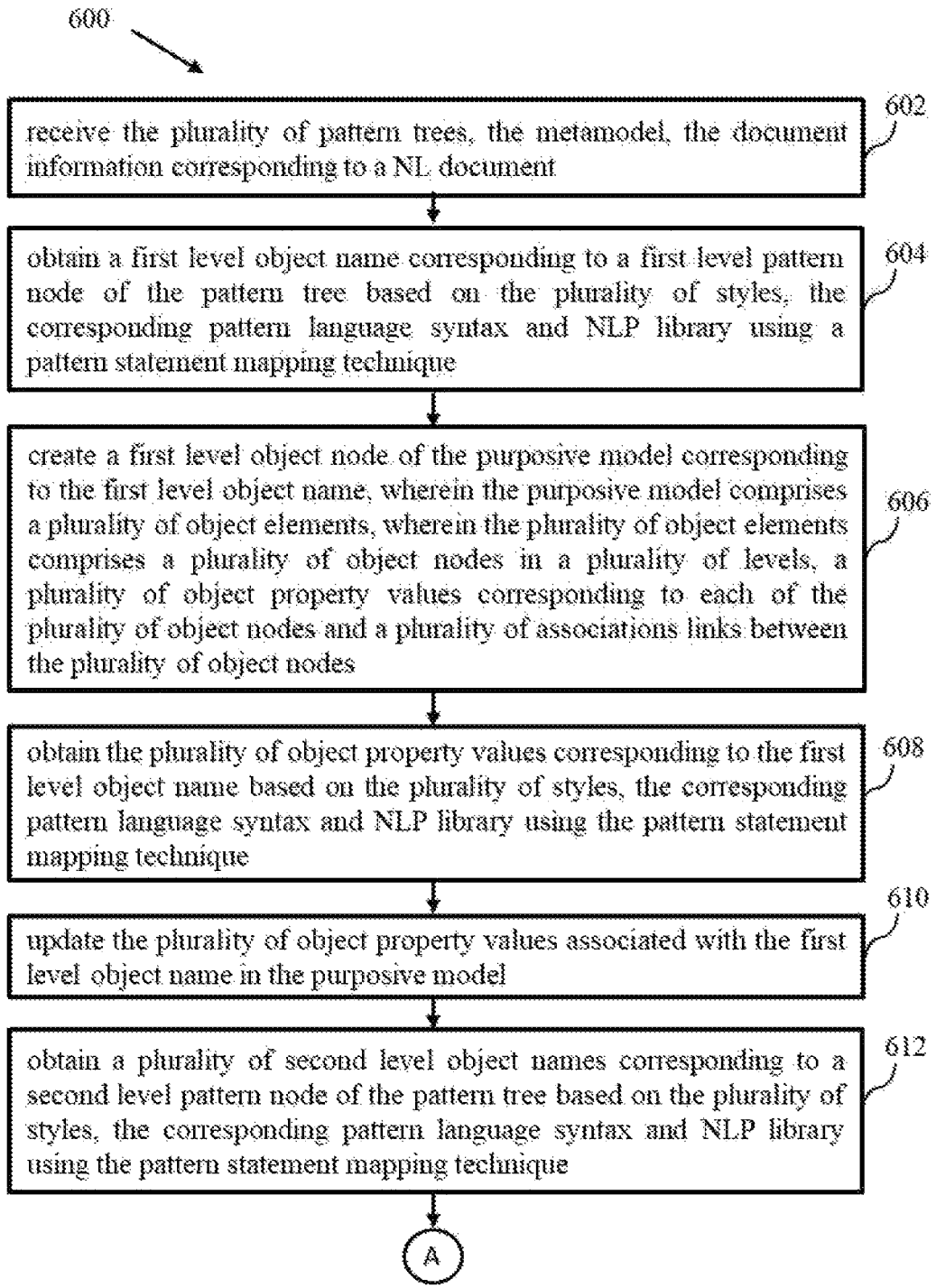
FIGS. 6A and 6B are exemplary flow diagram illustrating a processor implemented method 600 for pattern interpretation technique implemented by the system of FIG. 1 according to some embodiments of the present disclosure.
Figure 6B:
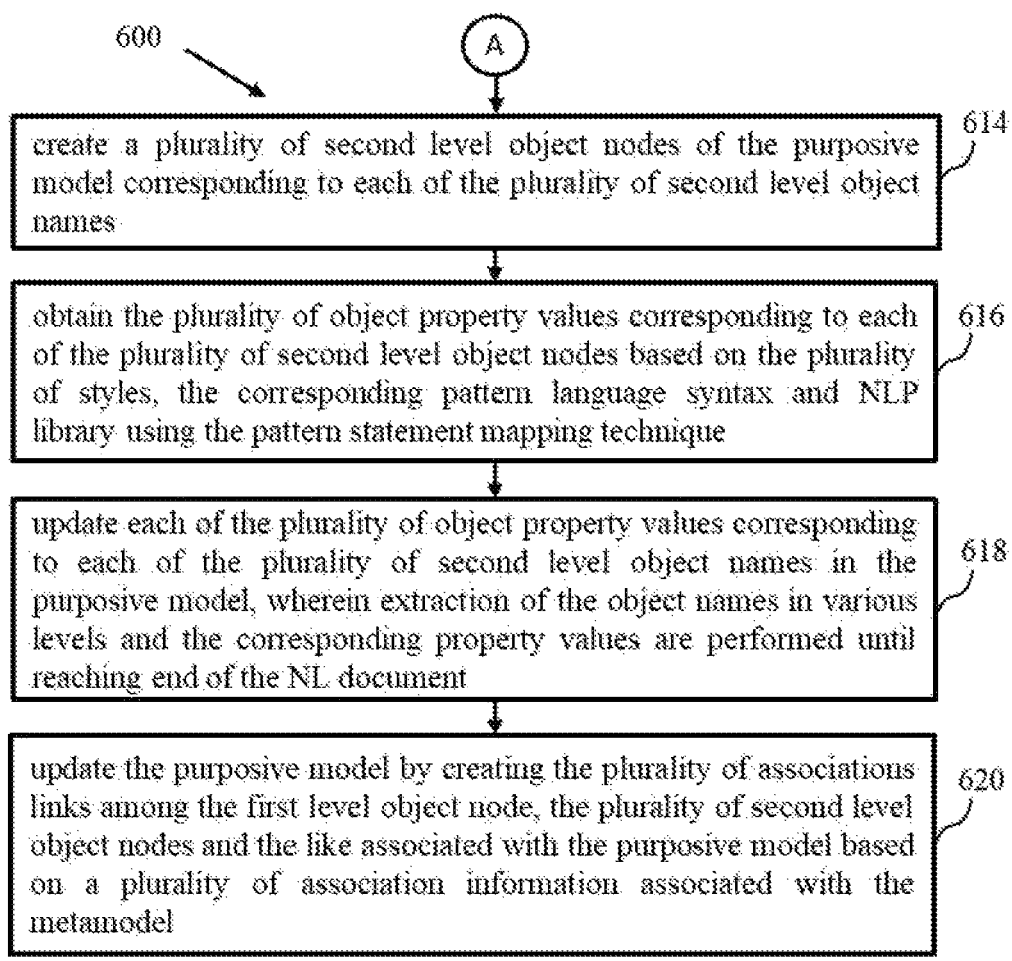

At step 306 of the method 300, the pattern interpretation module 204 executed by the one or more hardware processors 102 is configured by the programmed instructions to generate a plurality of purposive models for each of the plurality of NL documents by interpreting a corresponding document information based on the plurality of pattern trees and the metamodel using a pattern interpretation technique. In an embodiment, the method of generating a purposive model is explained in conjunction with FIGS. 6A and 6B. FIGS. 6A and 6B are exemplary flow diagrams illustrating a processor implemented method 600 for pattern interpretation technique implemented by the system of FIG. 1 according to some embodiments of the present disclosure.

Now referring to FIGS. 6A and 6B, at step 602 of the method 600, the one or more hardware processors 102 are configured by the programming instructions to receive the plurality of pattern trees, the metamodel, the document information corresponding to a NL document.

At step 604 of the method 600, the one or more hardware processors 102 are configured by the programming instructions to obtain a first level object name corresponding to a first level pattern node of the pattern tree based on the plurality of styles, the corresponding pattern language syntax and NLP library using a pattern statement mapping technique.

In an embodiment, the pattern statement mapping technique to obtain an object name is implemented in two steps. Initially, the text information corresponding to a pattern element of the pattern tree is extracted by mapping the pattern language syntax of the corresponding pattern statement with the plurality of styles. Further, the extracted text information is processed based on the language syntax of the corresponding pattern statement and NLP library functions augmented with configurable domain dictionary to obtain the corresponding object name. For example, considering the example input NL document given in Table I and the pattern tree given in FIG. 4, the pattern language syntax of the first node of the pattern tree is "UNIQUE STRLEFT (#Heading1, "→")". It is mapped with the Heading style, "Heading1" of the NL document "1. BCPDR→BCP" and the corresponding text information "BCPDR→BCP" is extracted. Further, the extracted text information "BCPDR→BCP" is processed using the syntax (library function STRLEFT) and the corresponding object name "BCPDR" is obtained.

Figure 7:
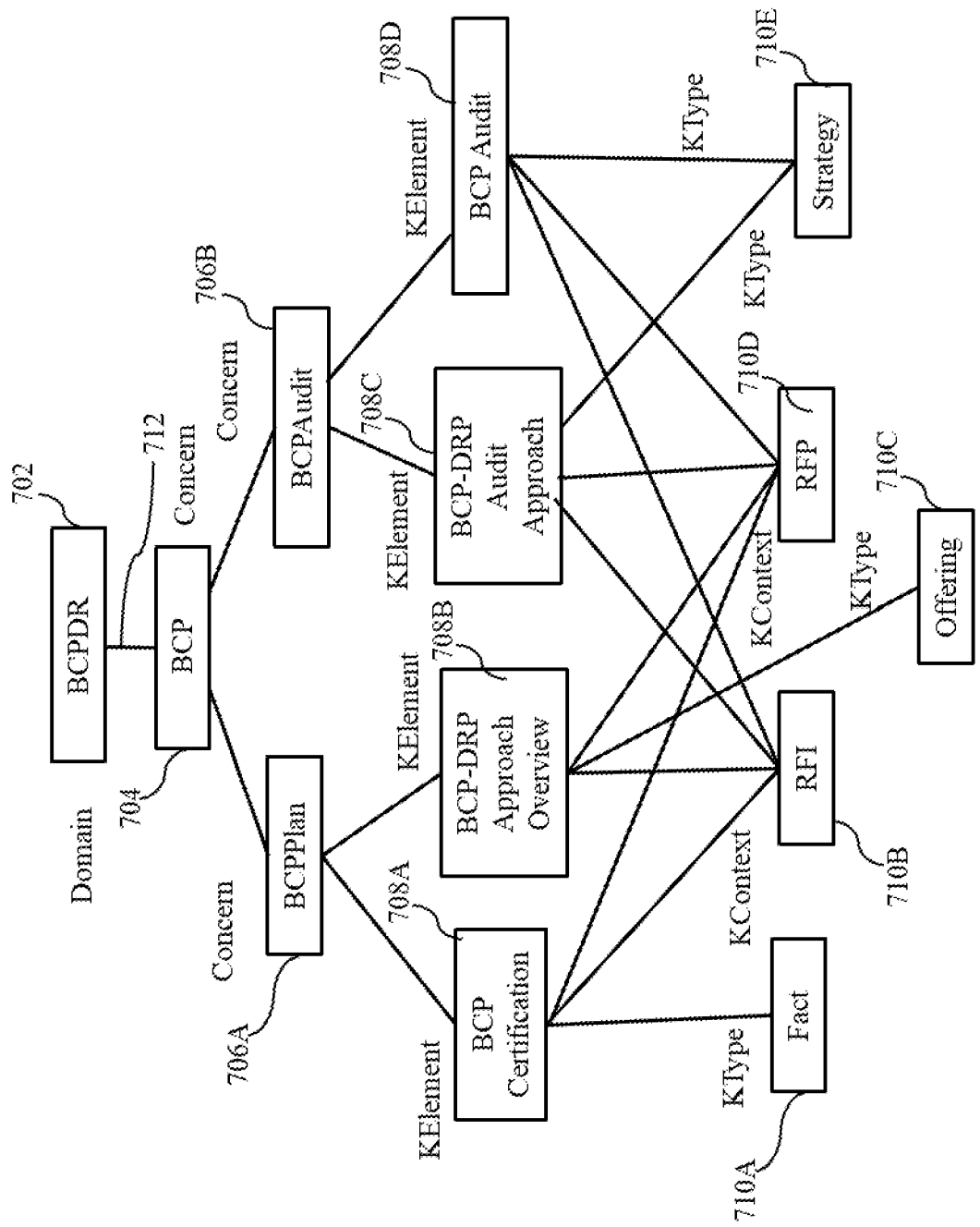
FIG. 7 is an exemplary purposive model for the processor implemented method 300 for automated authoring of purposive models from NL documents implemented by the system of FIG. 1 according to some embodiments of the present disclosure.

At step 606 of the method 600, the one or more hardware processors 102 are configured by the programming instructions to create a first level object node 702 of the purposive model shown in FIG. 7, corresponding to the first level object name.

In an embodiment, the purposive model as shown in FIG. 7 includes a plurality of object elements. The plurality of object elements includes a plurality of object nodes in a plurality of levels, a plurality of object property values corresponding to each of the plurality of object nodes and a plurality of associations links between the plurality of object nodes. For example, considering the example purposive model shown in FIG. 7, there are 5 different levels of object nodes. The first level is for "Domain" (702), the second level is for "Concern" (706A and 706B), the third level is for "KElement" (708A through 708D) and the fourth level is for "Knowledge types" and for "Knowledge contexts" (710A through 710E). The number of levels is configurable and depends on the input NL document and the pattern trees. The link 712 is related to an association between the "Domain" and the "Concern". Similarly, a plurality of associations are created among the plurality of object nodes based on the metamodel.

At step 608 of the method 600, the one or more hardware processors 102 are configured by the programming instructions to obtain the plurality of object property values corresponding to the first level object name based on the plurality of styles, the corresponding pattern language syntax and NLP library using the pattern statement mapping technique. For example, as shown in FIG. 4, pattern statement of property textArtifact of KElement syntax "STYLED FROM #Heading3 TILL #Heading3|#Heading2|#Heading1" extracts complete text from current heading3 till next heading3 or heading2 or heading1 along with styles.

At step 610 of the method 600, the one or more hardware processors 102 are configured by the programming instructions to update the plurality of object property values associated with the first level object name in the purposive model.

At step 612 of the method 600, the one or more hardware processors 102 are configured by the programming instructions to obtain a plurality of second level object names corresponding to a second level pattern node of the pattern tree based on the plurality of styles, the corresponding pattern language syntax and NLP library using the pattern statement mapping technique. For example, the object name "BCP" is obtained from the input NL document in this step.

At step 614 of the method 600, the one or more hardware processors 102 are configured by the programming instructions to create a plurality of second level object nodes of the purposive model corresponding to each of the plurality of second level object names. For example, node 704 of the FIG. 7 is created in this step.

At step 616 of the method 600, the one or more hardware processors 102 are configured by the programming instructions to obtain the plurality of object property values corresponding to each of the plurality of second level object nodes based on the plurality of styles, the corresponding pattern language syntax and NLP library using the pattern statement mapping technique.

At step 618 of the method 600, the one or more hardware processors 102 are configured by the programming instructions to update each of the plurality of object property values corresponding to each of the plurality of second level object names in the purposive model.

In an embodiment, the object name extraction in various levels and the corresponding property values extraction are performed until end of the NL document is reached. For example, the plurality of third level object names like "BCPPlan" and "BCPAudit" are extracted further and updated in the purposive model by creating corresponding object nodes 706A and 706B. Similarly, the fourth level object names like "BCP Certification", "BCP-DRP Approach Overview", "BCP-DRP Audit Approach" and "BCP Audit" are extracted and updated in the purposive model by creating the corresponding object nodes 708A through 708D. Further, the fifth level object names like "Fact", "RFI", "Offering", "RFP" and "Strategy" are extracted and updated in the purposive model by creating the corresponding object nodes 710A through 710E.

At step 620 of the method 600, the one or more hardware processors 102 are configured by the programming instructions to update the purposive model by creating the plurality of associations links among the first level object node, the plurality of second level object nodes and the like associated with the purposive model based on the plurality of association information associated with the metamodel shown in FIG. 5. For example, the Domain and Concern in the metamodel relates to zero to many associations. In the purposive model given in FIG. 7, there is only one concern at level one and hence the association 712 between the domain "BCPDR" and the concern "BCP" is generated. Similarly, the concern class of the metamodel is having zero to many associations among sub-concerns. Now referring to FIG. 7, associations link between the level 3 object nodes "BCPPlan" and "BCPAudit" and the level 2 object nodes are created based on the corresponding associations between the concern and the sub-concerns in the metamodel. Similarly, all possible associations are generated in the purposive model based on the corresponding associations in the metamodel.

Experimentation Details:

In an embodiment, a total 12 documents of different sizes having in total 2413 pages are validated. It was observed that each document specifies a set of features. Documents has a different structure and even within a document the structure was different based on the type of the feature. For automated authoring of model from the NL requirements specification documents one pattern per each feature type is defined. Table IV illustrates the output details of the above experimentation.

TABLE IV

| Pattern for Feature Type | ObjectNodeCount | Property Value Count | Link Count |
| --- | --- | --- | --- |
| PFunction | 6101 | 16777 | 6638 |
| Query | 1774 | 2591 | 1898 |
| Interface | 4124 | 15078 | 4513 |
| Report | 6462 | 10443 | 6962 |
| Total | 18461 | 44889 | 20011 |

In another embodiment, the present disclosure has been experimented for Request for Proposals (RFP)/Request for Information (RFI) application. RFP applications deals with providing answers to commonly asked questions. RFP approximately has 30 to 50 questions, deciding on proposed solution by referring to boilerplate documents is a time-consuming manual activity. This manual process of creation of response to Request for Proposal is automated. Purpose specific model was defined first to represent the information in RFP boilerplate word document files. FIG. 5 shows the simplified metamodel used for the information representation. FIG. 4 shows the pattern tree given as input to the tool for authoring purposive model. Total 38 documents of different sizes having in total 1102 pages are validated. Table V shows the authored model size.

TABLE V

| ObjectNode Count | Property Value Count | Link Count |
| --- | --- | --- |
| 2345 | 4071 | 5355 |

In an embodiment, the accuracy of the present disclosure is evaluated using Precision, Recall, and F1 score metrics as per standard formulae given in corresponding equations 1 thorough 3. Now referring to equation (1), TP is true positive, FP is false positive, and FN is false negative.

$$\text{Precision} = \frac{TP}{TP + FP} \quad (1)$$

$$\text{Recall} = \frac{TP}{TP + FN} \quad (2)$$

$$F1\ \text{Score} = 2 * \frac{\text{Recall} * \text{Precision}}{\text{Recall} + \text{Precision}} \quad (3)$$

In an embodiment, the pattern mapping language efficiency, the extent to which document can be authored using only the standard pattern syntax without using external functions is measured using the equation (4). It is observed that mapping efficiency of the present disclosure ranges from 83 to 100%. Property mapping efficiency of the present disclosure ranges from 73 to 100%. Association mapping efficiency of the present disclosure ranges from 77 to 100%.

$$\text{Language Efficiency For Pattern} = \frac{\sum \left(\begin{array}{c}\text{Metamodel elements without}\\ \text{external functions}\end{array}\right)}{\sum (\text{Total Metamodel elements})} \quad (4)$$

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of automated authoring of purposive models from NL documents. The present disclosure provides a generic solution for automated authoring of purposive models that is easily amenable for any NL-based document-centered context. The automated authoring is performed using metamodel, pattern interpreter and a configurable, extensible, and scalable architecture. Further, the present disclosure can generate a number of purposive models from an NL document based on the corresponding document structure, styles and the plurality of pattern trees.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automated authoring of purposive models from natural language (NL) documents, the method comprising:
receiving, by one or more hardware processors, a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax, wherein the pattern language syntax comprises a plurality of heading structures, a plurality of table value structures specifies ways to extract values from tables in the NL documents using a column heading, a row heading, or directly using a table cell column and a row number, a default value structure specifies an assignment of default values, a metamodel reference structure, a block structure specifies boundaries to extract a block of lines, a condition checking structure checks condition using extracted metamodel properties or function return values, function invocation structures invoke library functions or external library functions with parameter values, a control flow structure specifies document content navigation, and a plurality of looping structures iterates through all rows in the table and creates object node corresponding to each row text information;

generating, by the one or more hardware processors, a document information from each of the plurality of NL documents, using a document information reading technique, wherein the document information comprises a plurality of document styles and a text information corresponding to each of the plurality of document styles; and generating, by the one or more hardware processors, a plurality of purposive models for each of the plurality of NL documents by interpreting the document information corresponding to each of the plurality of NL documents, based on the plurality of pattern trees and the metamodel using a pattern interpretation technique, wherein the automated authoring of purposive models is parameterized on the metamodel and document structure-based patterns thereby providing an approach that is amenable to repurposing for NL-based document-centered context, and the approach is validated with diverse document formats and on multiple metamodels.

2. The processor implemented method of claim 1, wherein the plurality of pattern elements comprises a plurality of pattern nodes in a plurality of levels, a plurality of pattern properties corresponding to each of the plurality of pattern nodes, and a plurality of pattern edges.

3. The processor implemented method of claim 1, wherein generating a purposive model by interpreting the document information corresponding to each of the plurality of NL documents, based on the plurality of pattern trees and the metamodel using the pattern interpretation technique comprises:

receiving the plurality of pattern trees, the metamodel, the document information corresponding to a NL document;

obtaining a first level object name corresponding to a first level pattern node of the pattern tree based on the plurality of styles, the corresponding pattern language syntax and NLP library using a pattern statement mapping technique;

creating a first level object node of the purposive model corresponding to the first level object name, wherein the purposive model comprises a plurality of object elements, wherein the plurality of object elements comprises a plurality of object nodes in a plurality of levels, a plurality of object property values corresponding to each of the plurality of object nodes and a plurality of associations links between the plurality of object nodes;

obtaining the plurality of object property values corresponding to the first level object name based on the plurality of styles, the corresponding pattern language syntax and NLP library using the pattern statement mapping technique;

updating the plurality of object property values associated with the first level object name in the purposive model;

obtaining a plurality of second level object names corresponding to a second level pattern node of the pattern tree based on the plurality of styles, the corresponding pattern language syntax and NLP library using the pattern statement mapping technique;

creating a plurality of second level object nodes of the purposive model corresponding to each of the plurality of second level object names;

obtaining the plurality of object property values corresponding to each of the plurality of second level object nodes based on the plurality of styles, the corresponding pattern language syntax and NLP library using the pattern statement mapping technique;

updating each of the plurality of object property values corresponding to each of the plurality of second level object names in the purposive model, wherein extraction of the object names in various levels and the corresponding property values are performed until reaching end of the NL document; and updating the purposive model by creating the plurality of associations links among the first level object node, the plurality of second level object nodes and the like associated with the purposive model based on a plurality of association information associated with the metamodel.

4. The processor implemented method of claim 3, wherein obtaining each of the plurality of object elements of the purposive model based on the plurality of styles, the corresponding pattern language syntax and NLP library using the pattern statement mapping technique comprises (i) extracting the text information corresponding to a pattern element of the pattern tree by mapping the pattern language syntax of the corresponding pattern statement with the plurality of styles, and (ii) processing the extracted text information based on the language syntax of the corresponding pattern statement and NLP library functions augmented with configurable domain dictionary to obtain the corresponding object name.

5. A system for automated authoring of purposive models from natural language (NL) documents comprising:

at least one memory storing programmed instructions;

one or more Input/Output (I/O) interfaces; and one or more hardware processors operatively coupled to the at least one memory, wherein the one or more hardware processors are configured by the programmed instructions to:

receive a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax, wherein the pattern language syntax comprises a plurality of heading structures, a plurality of table value structures specifies ways to extract values from tables in the NL documents using a column heading, a row heading, or directly using a table cell column and a row number, a default value structure specifies an assignment of default values, a metamodel reference structure, a block structure specifies boundaries to extract a block of lines, a condition checking structure checks condition using extracted metamodel properties or function return values, function invocation structures invoke library functions or external library functions with parameter values, a control flow structure specifies document content navigation, and a plurality of looping structures iterates through all rows in the table and creates object node corresponding to each row text information;

generate a document information from each of the plurality of NL documents, using a document information reading technique, wherein the document information comprises a plurality of document styles and a text information corresponding to each of the plurality of document styles; and generate a plurality of purposive models for each of the plurality of NL documents by interpreting the document information corresponding to each of the plurality of NL documents, based on the plurality of pattern trees and the metamodel using a pattern interpretation technique, wherein the automated authoring of purposive models is parameterized on the metamodel and document structure-based patterns thereby providing an approach that is amenable to repurposing for NL-based document-centered context, and the approach is validated with diverse document formats and on multiple metamodels.

6. The system of claim 5, wherein the plurality of pattern elements comprises a plurality of pattern nodes in a plurality of levels, a plurality of pattern properties corresponding to each of the plurality of pattern nodes, and a plurality of pattern edges.

7. The system of claim 5, wherein generating a purposive model by interpreting the document information corresponding to each of the plurality of NL documents, based on the plurality of pattern trees and the metamodel using the pattern interpretation technique comprises:

receiving the plurality of pattern trees, the metamodel, the document information corresponding to a NL document;

obtaining a first level object name corresponding to a first level pattern node of the pattern tree based on the plurality of styles, the corresponding pattern language syntax and NLP library using a pattern statement mapping technique;

creating a first level object node of the purposive model corresponding to the first level object name, wherein the purposive model comprises a plurality of object elements, wherein the plurality of object elements comprises a plurality of object nodes in a plurality of levels, a plurality of object property values corresponding to each of the plurality of object nodes and a plurality of associations links between the plurality of object nodes;

obtaining the plurality of object property values corresponding to the first level object name based on the plurality of styles, the corresponding pattern language syntax and NLP library using the pattern statement mapping technique;

updating the plurality of object property values associated with the first level object name in the purposive model;

obtaining a plurality of second level object names corresponding to a second level pattern node of the pattern tree based on the plurality of styles, the corresponding pattern language syntax and NLP library using the pattern statement mapping technique;

creating a plurality of second level object nodes of the purposive model corresponding to each of the plurality of second level object names;

obtaining the plurality of object property values corresponding to each of the plurality of second level object nodes based on the plurality of styles, the corresponding pattern language syntax and NLP library using the pattern statement mapping technique;

updating each of the plurality of object property values corresponding to each of the plurality of second level object names in the purposive model, wherein extraction of the object names in various levels and the corresponding property values are performed until reaching end of the NL document; and updating the purposive model by creating the plurality of associations links among the first level object node, the plurality of second level object nodes and the like associated with the purposive model based on a plurality of association information associated with the metamodel.

8. The system of claim 7, wherein obtaining each of the plurality of object elements of the purposive model based on the plurality of styles, the corresponding pattern language syntax and NLP library using the pattern statement mapping technique comprises (i) extracting the text information corresponding to a pattern element of the pattern tree by mapping the pattern language syntax of the corresponding pattern statement with the plurality of styles, and (ii) processing the extracted text information based on the language syntax of the corresponding pattern statement and NLP library functions augmented with configurable domain dictionary to obtain the corresponding object name.

9. One or more non-transitory machine readable information storage mediums comprising one or more instructions which when executed by one or more hardware processors causes:

receiving a plurality of Natural Language (NL) documents, a metamodel, a plurality of pattern trees corresponding to the metamodel, and a configurable domain dictionary, wherein each of the plurality of pattern trees comprises a plurality of pattern elements, wherein each of the plurality of pattern elements comprises a corresponding pattern statement defined using a pattern language syntax, wherein the pattern language syntax comprises a plurality of heading structures, a plurality of table value structures specifies ways to extract values from tables in the NL documents using a column heading, a row heading, or directly using a table cell column and a row number, a default value structure specifies an assignment of default values, a metamodel reference structure, a block structure specifies boundaries to extract a block of lines, a condition checking structure checks condition using extracted metamodel properties or function return values, function invocation structures invoke library functions or external library functions with parameter values, a control flow structure specifies document content navigation, and a plurality of looping structures iterates through all rows in the table and creates object node corresponding to each row text information;

generating a document information from each of the plurality of NL documents, using a document information reading technique, wherein the document information comprises a plurality of document styles and a text information corresponding to each of the plurality of document styles; and generating a plurality of purposive models for each of the plurality of NL documents by interpreting the document information corresponding to each of the plurality of NL documents, based on the plurality of pattern trees and the metamodel using a pattern interpretation technique, wherein the automated authoring of purposive models is parameterized on the metamodel and document structure-based patterns thereby providing an approach that is amenable to repurposing for NL-based document-centered context, and the approach is validated with diverse document formats and on multiple metamodels.

10. The one or more non-transitory machine readable information storage mediums of claim 9, wherein the plurality of pattern elements comprises a plurality of pattern nodes in a plurality of levels, a plurality of pattern properties corresponding to each of the plurality of pattern nodes, and a plurality of pattern edges.

11. The one or more non-transitory machine readable information storage mediums of claim 9, wherein generating a purposive model by interpreting the document information corresponding to each of the plurality of NL documents, based on the plurality of pattern trees and the metamodel using the pattern interpretation technique comprises:

receiving the plurality of pattern trees, the metamodel, the document information corresponding to a NL document;

obtaining a first level object name corresponding to a first level pattern node of the pattern tree based on the plurality of styles, the corresponding pattern language syntax and NLP library using a pattern statement mapping technique;

creating a first level object node of the purposive model corresponding to the first level object name, wherein the purposive model comprises a plurality of object elements, wherein the plurality of object elements comprises a plurality of object nodes in a plurality of levels, a plurality of object property values corresponding to each of the plurality of object nodes and a plurality of associations links between the plurality of object nodes;

obtaining the plurality of object property values corresponding to the first level object name based on the plurality of styles, the corresponding pattern language syntax and NLP library using the pattern statement mapping technique;

updating the plurality of object property values associated with the first level object name in the purposive model;

obtaining a plurality of second level object names corresponding to a second level pattern node of the pattern tree based on the plurality of styles, the corresponding pattern language syntax and NLP library using the pattern statement mapping technique;

creating a plurality of second level object nodes of the purposive model corresponding to each of the plurality of second level object names;

obtaining the plurality of object property values corresponding to each of the plurality of second level object nodes based on the plurality of styles, the corresponding pattern language syntax and NLP library using the pattern statement mapping technique;

updating each of the plurality of object property values corresponding to each of the plurality of second level object names in the purposive model, wherein extraction of the object names in various levels and the corresponding property values are performed until reaching end of the NL document; and updating the purposive model by creating the plurality of associations links among the first level object node, the plurality of second level object nodes and the like associated with the purposive model based on a plurality of association information associated with the metamodel.

12. The one or more non-transitory machine readable information storage mediums of claim 11, wherein obtaining each of the plurality of object elements of the purposive model based on the plurality of styles, the corresponding pattern language syntax and NLP library using the pattern statement mapping technique comprises (i) extracting the text information corresponding to a pattern element of the pattern tree by mapping the pattern language syntax of the corresponding pattern statement with the plurality of styles, and (ii) processing the extracted text information based on the language syntax of the corresponding pattern statement and NLP library functions augmented with configurable domain dictionary to obtain the corresponding object name.

* * * * *